(12) United States Patent
Lewarchik et al.

(10) Patent No.: US 9,428,653 B2
(45) Date of Patent: Aug. 30, 2016

(54) ONE PART, STORAGE STABLE POLYMERIZABLE FORMULATION

(71) Applicant: Chemical Dynamics, LLC, Plymouth, MI (US)

(72) Inventors: Ron Lewarchik, Brighton, MI (US); Mihir Sureshbhai Shah, Canton, MI (US)

(73) Assignee: Chemical Dynamics, LLC, Plymouth, MI (US)

( * ) Notice: Subject to any disclaimer, the term of this patent is extended or adjusted under 35 U.S.C. 154(b) by 0 days.

(21) Appl. No.: 14/590,000

(22) Filed: Jan. 6, 2015

(65) Prior Publication Data

US 2015/0125614 A1    May 7, 2015

Related U.S. Application Data

(63) Continuation of application No. 12/898,436, filed on Oct. 5, 2010, now Pat. No. 8,927,649.

(60) Provisional application No. 61/248,636, filed on Oct. 5, 2009.

(51) Int. Cl.
| | |
|---|---|
| *C09D 4/00* | (2006.01) |
| *C09D 7/12* | (2006.01) |
| *C08F 216/12* | (2006.01) |
| *C08F 222/10* | (2006.01) |
| *C08F 230/08* | (2006.01) |
| *C08K 5/00* | (2006.01) |

(52) U.S. Cl.
CPC ............. *C09D 7/1233* (2013.01); *C09D 4/00* (2013.01); *C09D 7/1241* (2013.01); *B05D 2202/10* (2013.01); *C08F 216/125* (2013.01); *C08F 222/1006* (2013.01); *C08F 230/08* (2013.01); *C08K 5/0008* (2013.01); *Y10T 428/269* (2015.01)

(58) Field of Classification Search
None
See application file for complete search history.

(56) References Cited

U.S. PATENT DOCUMENTS

| | | | |
|---|---|---|---|
| 4,317,894 A | 3/1982 | Lewarchik et al. | |
| 6,310,115 B1 | 10/2001 | Vanmaele et al. | |

FOREIGN PATENT DOCUMENTS

EP         0234641 A1 *  2/1987  ............... C09D 3/64

\* cited by examiner

*Primary Examiner* — Vu A Nguyen
(74) *Attorney, Agent, or Firm* — Avery N. Goldstein; Blue Filament Law LLC

(57) ABSTRACT

A one part, storage stable polymerizable formulation is provided that includes an ethenically unsaturated polymerizable compound intermixed with a free radical polymerization initiator and an organic solvent. The organic solvent provides storage stability and upon evaporation of the solvent, the rate of polymerization of the compound accelerates independent of addition of a second part. The formulation includes at least 30 total weight percent solids upon cure. Optional additives to the formulation include at least one of a cure accelerator, a filler, a plasticizer, a colorant, and a cure inhibitor. A process for forming a polymerized coating on an article involves the application of this formulation to the substrate of an article and allowing sufficient time for the solvent to evaporate to form the polymerized coating on the article. The substrate of the article forms a corrosion barrier even without prior removal of a native corrosion layer on a surface of the substrate of the article.

28 Claims, No Drawings

ONE PART, STORAGE STABLE POLYMERIZABLE FORMULATION

CROSS-REFERENCE TO RELATED APPLICATION

This application is a continuation of U.S. application Ser. No. 12/898,436 filed Oct. 5, 2010 that in turn claims priority of U.S. Provisional Patent Application Ser. No. 61/248,636 filed Oct. 5, 2009, the contents of these applications are incorporated herein by reference.

FIELD OF THE INVENTION

The present invention in general relates to a one part polymerizable formulation well suited for coatings and in particular to free radical initiated polymerizable formulations that are stabilized in part through solvent dilution.

BACKGROUND OF THE INVENTION

The protection of a surface with a polymeric coating requires extensive removal of surface debris, grease, and other liquids from the surface, else the applied coating will have poor adhesion that reduces the coating lifetime and exposes the substrate to environmental exposure. These difficulties are compounded when higher molecular weight polymer precursors are used that, owing to size and conformational limitations, are unable to permeate well into a porous or scaly substrate. A further complication of coating a surface with a polymerizable formulation entails mixing of a two part formulation to initiate the polymerization reaction and coating formation. As a result, the formulation must be applied on a timetable consistent with cure rate and also take into account the ever-increasing viscosity of the formulation upon combination of the formulation parts. The use of a two part polymerizable formulation largely precludes spray application as curing tends to foul spray nozzles. Additionally, upon initiating polymerization of a two part formulation, any unused formulation is wasted.

Owing to these limitations, there exists a need for a one part, storage stable polymerizable formulation. Such a formulation is amenable to spray, roll or brush application.

SUMMARY OF THE INVENTION

A one part, storage stable polymerizable formulation is provided that includes an ethenically unsaturated polymerizable compound intermixed with an optional free radical polymerization initiator and an organic solvent. The organic solvent provides storage stability and upon evaporation of the solvent, the rate of polymerization of the compound accelerates independent of addition of a second part. The formulation includes at least 30 total weight percent solids upon cure. Optional additives to the formulation include at least one of a cure accelerator, a filler, a plasticizer, a colorant, and a cure inhibitor. A process for forming a polymerized coating on an article involves the application of this formulation to the substrate of an article and allowing sufficient time for the solvent to evaporate to form the polymerized coating on the article. The substrate of the article forms a corrosion barrier even without prior removal of a native corrosion layer on a surface of the substrate of the article.

DETAILED DESCRIPTION OF THE PREFERRED EMBODIMENTS

The present invention has utility as a polymerizable formulation from which a coating is formed upon application to a substrate. According to the present invention, storage stability is obtained in a one part polymerizable formulation through the inclusion of a quantity of solvent sufficient to dilute an ethenically unsaturated polymerizable compound and an initiator and/or catalyst to concentrations at which the polymerization is arrested. As a result, consistent viscosity formulation is applied and only upon dissipation of the organic solvent and exposure to air does polymerization of the inventive formulation kinetically accelerate. As a result, an inventive formulation is applied with a consistent viscosity and unused formulation is readily stored for further usage. Through selection of monomeric ethenically unsaturated polymerizable compounds, an inventive formulation is able to penetrate the surface of a fouled substrate prior to polymerization thereby allowing for protective coating to be applied to a substrate with lessened or no substrate preparation prior to application of the inventive formulation. Representative fouled substrates to which an inventive formulation are directly applied illustratively include corroded metals such as rusted steel, oxidized aluminum, anodized aluminum, pickled steel, stainless steel, painted metals, and hot dipped galvanized steel, Galfan, Galvalume, Zincalume; cement; concrete; wood substrates such as painted wood, partially rotted wood, fabrics, drywall and plastics with porous surfaces as well as fiberboard. An inventive formulation is particularly well suited for formulation as an aerosol with a propellant. An attribute of a coating produced by an inventive formulation is that an air and moisture barrier is formed that inhibits subsequent corrosion of a substrate, even when already overlayered with a corrosion layer.

An ethenically unsaturated polymerizable compound operative in the present invention includes a carbon-carbon double bond referred to synonymously herein as point of ethenic unsaturation. Operative moieties found within an inventive ethenically unsaturated polymerizable compound include allylic moieties of the formula:

$$Y-X-(CR_2-RC=CR)_n-R \qquad (I)$$

where R in each occurrence is independently H, $C_1$-$C_4$ alkyl, $C_1$-$C_4$ perfluoroalkyl, $C_6$ aryl, $C_6$ aryl having at least one substituent of $C_1$-$C_4$ alkyl; n is an integer of 1 to 50; and X is oxygen or R, Y is a nullity or a polymeric resin backbone of acrylic, oligomeric ester of up to 30 repeat units, polyester, epoxy, polyether, alkyd, polyurethane. It is appreciated that an oligomer or resin backbone may contain only a single allylic moiety, two or multiple such moieties per structure (I) in the context of the present invention. In a preferred embodiment R in each occurrence is H.

Acrylate moieties are also operative in an ethenically unsaturated polymerizable compound of an inventive formulation and have the general formula:

$$Y-R-O(O)C-RC=CR_2 \qquad (II)$$

where R and Y are defined as above with respect to Formula (I). Methacrylate moieties of the formula $YRO(O)C-CH_3C=CH_2$ are particularly preferred in an inventive formulation and noted to have a reduced reactivity relative to a corresponding purely protonated allylic and acrylate compound. As a general trend of reactivity allylic>acrylate>alkyl acrylate>aryl acrylate. Reactivity rates of a given ethenically unsaturated polymerizable compound are a factor in controlling storage stability of a formulation.

It is appreciated that inclusion of a mixture of compounds per structure (I) are readily prepared as an inventive formulation to optimize initial viscosity, storage stability, cure time, resultant coating hardness, and substrate adhesion characteristics. By way of example, an epoxy of formula (I) is noted to be well suited to improve adhesion to clean metal substrates such as aluminum and steel.

Representative ethenically unsaturated polymerizable compounds operative herein illustratively include methyl methacrylate, hydroxyethyl methacrylate, tetrahydrofurfuryl methacrylate, trimethyl cyclohexyl methacrylate, cyclohexyl methacrylate, methacrylic acid, isobornyl methacrylate, ethoxyethyl methacrylate, 2-ethylhexyl methacrylate, and dicyclopentenyl oxyethyl methacrylate. Typical polyfunctional monomers include, but are not limited to, methacrylate esters of polyethylene glycols, such as the esters of triethylene glycol 1,6-hexane dial, polypropylene glycol, 1,3- and 1,4-butylene glycol and 1,12-dodecanediol, trimethylol propane trimethacrylate, ethoxylated bisphenol A dimethacrylate.

Representative ethenically unsaturated materials may also include a suitable unsaturated alkyd. Alkyds are prepared from polyols, dibasic acids and fatty acid. They are essentially oil modified polyesters. Alkyds are classified into oxidizing or nonoxidizing types. Oxidizing alkyds cross-link through air oxidizing polymerization. Alkyds can be further segmented into the amount of saturated or unsaturated oil that is used. For example, alkyds with an oil length of greater than 60% are long oil alkyds, oil lengths between 40 and 605 are known as medium oil alkyds and alkyds with less than 40% are known as short oil alkyds. Examples of unsaturated fatty acids for use to form alkyds that may be combined with suitable polyols and dibasic acids include soya, safflower and sunflower. Alkyds that contain suitable unsaturated fatty acid drying oils or other suitable ethenically unsaturated materials can be used in conjunction with other ethenically unsaturated compounds in subject invention.

Polymerization initiator is provided in an inventive formulation to commence a free radical polymerization reaction so as to form covalent bonds between the ethenically unsaturated polymerizable compounds. Free radical initiators operative herein illustratively include ketone peroxide, diacyl peroxide, perester, perketals, diacyl peroxides, peroxydicarbonates, and hydroperoxide. Selection of a given initiator from among those listed above is dependent on factors such as the desired activation temperature of the inventive formulation, solubility of the initiator inventive formulation through appreciation that soluble initiators undergo homogeneous reaction catalysis that tends to be faster than that of insoluble initiators; and initiator degradation products. With respect to these factors, it is appreciated that initiator stability is dependent on energy activation associated with steric hindrance and resonant structure stability. With respect to products of degradation, initiators typically degrade to reduced product less an abstracted oxygen atom. Stability of the substrate towards this degradation product represents a consideration in creation of an inventive formulation. By way of example, dibenzoyl peroxide generates a primary degradation product of benzoic acid. Additionally, creating an inventive formulation, the inclusion of water within an organic solvent diluent is also a consideration as water typically reduces the effective cure rate and is often less volatile than an organic solvent. By way of an example, a free radical polymerization initiator having solubility in both water and organic solvent tends to be more stable and therefore less reactive in the presence of water. Representative initiators operative herein illustratively include those organic hydroperoxides having the formula ROOH wherein $R^6$ is a hydrocarbon radical containing up to about 18 carbon atoms, preferably an alkyl, aryl, or aralkyl radical containing from one to 12 carbon atoms. Typical examples of such hydroperoxides are cumene hydroperoxide, tertiary butyl hydroperoxide, methyl ethyl ketone peroxide, and hydroperoxides formed by the oxygenation of various hydrocarbons, such as methylbutene, cetane, and cyclohexene, and various ketones and ethers. Other examples of useful initiators include hydroperoxides such as p-methane hydroperoxide, 2,5-dimethylhexane, and 2,5-dihydroperoxide. The initiator is typically present from 1 to 6 weight percent of the polymerizable compound, with from 2 to 4 weight percent of the polymerizable compound being preferred.

An organic solvent is present in an inventive formulation as a nonreactive diluent for the ethenically unsaturated polymerizable compound and free radical initiator so as to impart storage stability to the mixture of polymerizable compound and initiator. A suitable organic solvent is nonreactive with the polymerizable compound and initiator under storage and polymerization conditions. Preferably, the organic solvent is not a volatile organic compound (VOC) as defined by the U.S. Environmental Protection Agency. Suitable organic solvents operative herein illustratively include methyl acetate, methyl ethyl ketone, toluene, tetrahydrofuran, aromatic 100, $C_2$-$C_6$ acetates such as n-propyl acetate, t-butyl acetate, and n-hexyl acetate, and other ketone and ester based oxygenated solvents. The organic solvent is selected so as to impart solubility on the polymerizable compound and preferably on the free radical initiator as well. Preferably, an acetate constitutes a majority component of the organic solvent present. The organic solvent is typically present from 1 to 40 weight percent of a fully formulated inventive formulation. Organic solvent or mixture of solvents is selected not only to solubilize the polymerizable compound but also to volatilize rapidly relative to the polymerization rate as residual solvent can diminish the barrier properties of a coating formed from an inventive formulation. Preferably, the organic solvent is present from 1 to 50 total weight percent. More preferably, the organic solvent is solely an acetate present from 5 to 40 total weight percent. In the event that water is optionally added to the organic solvent, water is typically present from 1 to 10 total weight percent and preferably from 2 to 8 total weight percent.

Optionally, a cure accelerator is provided to modify the kinetics and progression of the polymerization process. Accelerators operative herein include salts of transition metals such as vanadium, molybdenum, cobalt, iron, zirconium, or copper. Of these transition metals, a combination of cobalt and manganese is known to the art to promote surface cure relative to through cure while zirconium or a combination of cobalt and zirconium facilitates through cure. Cobalt accelerators, zirconium accelerators, and a combination thereof are known to induce oxidation. Suitable accelerator salts operative herein include naphthenates, acetyl acetonates, and 2-ethyl hexanoic acid. Accelerators, if present, are found in an inventive formulation in an amount from 0 to 10 total weight percent and preferably between 0.01 and 1 total weight percent of the transition metal salt itself.

In instances when an accelerator is present, an anti-skinning agent such as an aliphatic keto oxime is provided to control surface oxidation associated with transition metal accelerator. Other anti-skinning agents are available as well as phenolics as well as nonphenolics and oxime free anti-skinning agents from suppliers such as OMG trade named Ascinin may also be used. Representative aliphatic keto oximes include methyl ethyl keto oxime, methyl propyl keto oxime, methyl terbutyl keto oxime, and methyl isobutyl keto oxime. Typically, an aliphatic keto oxime is present from 0.2 to 3.0 total weight percent and is preferably present in concert with a cobalt-based accelerator. Cobalt-aliphatic keto oxime combinations are also known in the art to accelerate cure rates.

Other optional additives to an inventive formulation illustratively include fillers, plasticizers, colorants, and cure inhibitors.

Fillers operative in an inventive formulation illustratively include particulate of silica, glass microspheres, calcium carbonate, talc, mica clay, diatomaceous earth, glass microspheres, polymeric microspheres, and combinations thereof. A filler is typically present from 0 to 20 total weight percent of a formulation. Fillers are appreciated to affect the hardness of a resultant coating formed from an inventive formulation and modify the rheology of the formulation.

An optional plasticizer is provided to modify the hardness of a resultant coating formed from an inventive formulation. A plasticizer is typically present from 0 to 10 total weight percent and preferably from 1 to 5 total weight percent. Plasticizers operative herein include phthalates such as diethyl, dibutyl, dibenzyl, and mixed benzyl-alkyl, and combinations thereof.

An optional colorant is provided to modify the hardness of a resultant coating formed from an inventive formulation. A colorant is typically present from 0 to 50 total weight percent and preferably from 2 to 25 total weight percent. Colorants operative herein include organic, inorganic and mixed metal oxide pigments such as carbon black, titanium oxide, phthalol blue, quinacridone red, red iron oxide, copper chrome black, as well as soluble or insoluble dyes and combinations thereof.

An optional cure inhibitor is provided to modify the hardness of a resultant coating formed from an inventive formulation. A cure inhibitor is typically present from 0 to 5 total weight percent and preferably from 0.1 to 3 total weight percent. Cure inhibitors operative herein include phthalates such as diethyl, dibutyl, dibenzyl, and mixed benzyl-alkyl, and combinations thereof.

An inventive formulation is able to penetrate a corrosion overlayer and bond to an underlying substrate. Preferably, the cross-linking density is such that an inventive coating forms an air and moisture barrier to inhibit subsequent corrosion. To achieve such a result, preferably an inventive formulation is greater than 30 total weight percent solids as measured by heat cured weight relative to the as-applied formulation. More preferably, the formulation is greater than 50 total weight percent solids upon cure and most preferably is between 60 and 92 total weight percent solids. It is appreciated that higher percent solids formulations tend to have higher initial viscosities and higher coating densities relative to lower percent solids.

It is appreciated that only a thin coating of between 10 and about 500 microns is needed to adequately protect a typical substrate. While an inventive formulation is readily applied to a substrate by swabbing or pump spray, it is appreciated that coating uniformity is readily obtained by application from a spray aerosol, such as from a can. As such, a propellant is optionally added in a range from 5 to 95 total weight percent with the proviso that the propellant and diluent solvent together do not exceed 97 total weight percent of the formulation. Suitable propellants include those that are unreactive towards the capped silanol fluid and illustratively include alkanes such as butane, pentane, isobutane, propane; ethers such as dimethyl ether, diethyl ether, nitrogen; halogenated hydrocarbons; carbon dioxide and combinations thereof. The resultant formulation inclusive of a propellant is sealed within a conventional metal aerosol canister and applied by spray application.

Upon complete cure, typically greater than 72 hours, an inventive coating is amenable to reapplication of an inventive formulation or a conventional paint application. Suitable paints include oil-based, latex, and water-based paints.

The present invention is further detailed with respect to the following nonlimiting examples.

Example 1

Thirty-five grams of trimethylol propane trimethacrylate are combined with 30 grams of 2 mol ethoxylated bisphenol A dimethacrylate and 20 grams of polyallyl glycidyl ether diluted with 10 grams of toluene. One gram of methacryloxypropyl trimethoxysilane is added along with 60 milligrams of cobalt 2-ethyl hexanate and 60 milligrams of zirconium 2-ethyl hexanate. Three grams of cumene hydroperoxide are added to the solvent diluted ethenically unsaturated compound mixture. One gram of methyl ethyl keto oxime is mixed into the inventive formulation. The inventive formulation is storage stable for more than 1 month at ambient temperature fluctuating between 10° and 28° Celsius. The resultant formulation readily penetrates a rusted steel object and forms a coating upon cure. A peel test on the cured coating performed at 20° Celsius attached the rust layer and exposed clean steel substrate.

Example 2

The formulation of Example 1 is repeated with an allyl functional aliphatic urethane replacing the ethoxylated bisphenol A methacrylate and t-butyl peroxy benzoate replacing cumene hydroperoxide at equivalent weight levels. The resultant formulation cured upon toluene volatilization on a corroded steel substrate to achieve a comparable coating.

Example 3

The formulation of Example 1 is repeated with toluene being replaced with 6 grains of methyl acetate and 4 grams of methyl ethyl ketone. A comparable coating is obtained upon dissipation of the methyl ethyl ketone and methyl acetate solvents on a rusted steel substrate.

Example 4

The formulation of Example 1 is repeated increasing the quantity of trimethylol propane trimethacrylate to 50 grams with a decrease in the amount of ethoxylated bisphenol A dimethacrylate to 22 grams. A comparison of formulation properties between Example 1 and Example 4 24 hours after formulation in a sealed container at 20° Celsius, 2 hours after application to a wood substrate at 600 Celsius, and on wood after 24 hours exposed to the environment at 20° Celsius is provided.

TABLE 1

| | Comparative Formulation | | |
| --- | --- | --- | --- |
| | Properties | | |
| Formulation | 24 h @ 20° C. (sealed) | 2 h @ 60° C. (wood) | 24 h @ 20° C. (wood) |
| Example 1 | liquid | hard | cured |
| Example 4 | Gel | hard | cured |

Example 5

The formulation of Example 1 is repeated with toluene being replaced with 24.5 grams of t-butyl acetate and the inclusion of 2.4 grams of carbon black. The resultant formulation is storage stable for more than 1 month at an ambient temperature fluctuating between 10° and 28° Celsius. The resultant formulation has a density of 1.03 kilograms per liter.

Example 6

Twelve grams of trimethylol propane trimethacrylate are combined with 31 grams of a long oil soya alkyd, and 10 grams of 2 mol ethoxylated bisphenol A dimethacrylate and 6 grams of polyallyl glycidyl ether diluted with 16 grams of t-butyl acetate. 0.6 gram of methacryloxypropyl trimethoxysilane is added along with 51 milligrams of cobalt 2-ethyl hexanate and 81 milligrams of zirconium 2-ethyl hexanate. 13 milligrams grams of methyl ethyl ketoxime are added to the solvent diluted ethenically unsaturated compound mixture. 7 grams of a carbon black pigment dispersion containing about 30% pigment is then added to the mixture. The inventive formulation is storage stable for more than 1 month at ambient temperature at 25° Celsius as well as 7 days at 120° Fahrenheit. The resultant formulation readily penetrates a rusted steel object and forms a coating upon cure. A peel test on the cured coating performed at 200 Celsius attached the rust layer and exposed clean steel substrate.

Example 7

The formulation of Example 6 is applied to cold rolled steel and is cured at 60° Celsius with complete cure at 16 hours. Temperature cure is noted in between 16 and 24 hours with the resultant inventive coating covered steel coupons being subjected to various tests. For comparison, the same steel coupons are coated with a conventional corrosion inhibition coating commercially available from Eastwood Company (Pottstown, Pa.). The Eastwood rust prevention solution is noted to dry in less than 8 hours to a comparable level of surface hardness and to be completely tack and fingerprint free. The test coupons were subjected to the following tests on separate coupons to determine coating attributes:

- tensile hardness of cured film 72 hours after application via ASTM D3363
- methyl ethyl ketone (MEK) double rub solvent resistance rub test per ASTM D4752
- cyclic corrosion test per ASTM D6899 for 30 days through cycles of moisture, salt, and acid rain
- high humidity and temperature test 150 hours at 100% condensing humidity at 49° Celsius for 150 hours
- repeat of high humidity and temperature test for formulations applied on pre-rusted steel A summary of the environmental coating testing is provided below in Table 2

TABLE 2

Summary of Environmental Coating Testing: Inventive Coating (Example 5) and Comparative Coating

|  | Example 6 | Comparative |
| --- | --- | --- |
| Pencil Hardness* | H | 3B |
| MEK Double Rub | >100 | 3 |
| Cyclic Corrosion | naked eye visually unchanged | rust, loss of adhesion, blistering |
| High Humidity/ High Temperature | naked eye visually unchanged | tarnish, rust |
| Pre-rusted High Humidity/ High Temperature | naked eye visually unchanged | rust, loss of adhesion, blistering |

*Pencil hardness hardest to softest: 6H > 5H > 4H > 3H > 2H > H > F > HB > B > 2E > 3B Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A one part, storage stable polymerizable formulation comprising:
    a first polymerizable compound comprising allylic moieties;
    a second polymerizable compound that has the formula:

$$Y—X—(CR_2—RC=CR)_n—R \quad (1)$$

where R in each occurrence is independently H, $C_1$-$C_4$ alkyl, $C_1$-$C_4$ perfluoroalkyl, $C_6$ aryl, $C_6$ aryl having at least one substituent of $C_1$-$C_4$ alkyl; n is an integer of 1 to 50; X is oxygen or R; and Y is one of a nullity or a polymeric resin backbone of acrylic, oligomeric ester of up to 30 repeat units, polyester, epoxy, polyether, alkyd, or polyurethane;
    an organic solvent in which said first polymerizable compound and said second polymerizable compound are soluble, said solvent providing storage stability and upon evaporation of said solvent, a rate of polymerization of said formulation accelerates independent of addition of a second part;
    one or more monomeric ethylenically unsaturated polymerizable compounds of methacrylate esters of polyethylene glycols, trimethylol propane trimethacrylate, or ethoxylated bisphenol A dimethacrylate;
    an anti-skinning agent; and
    a transition metal salt cure accelerator; and
    an optional additive of at least one of a free radical polymerization initiator, a filler, a plasticizer, a colorant, and a cure inhibitor;
    wherein the formulation is 30 to 92 total weight percent solids.

2. The formulation of claim 1 wherein the alkyd comprises an unsaturated fatty acid.

3. The formulation of claim 1 further comprising a third polymerizable compound that has the formula:

$$Y—R—O(O)C—RC=CR_2 \quad (2)$$

where R in each occurrence is independently H, $C_1$-$C_4$ alkyl, $C_1$-$C_4$ perfluoroalkyl, $C_6$ aryl, $C_6$ aryl having at least one substituent of $C_1$-$C_4$ alkyl and Y is an alkyd (II).

4. The formulation of claim 3 wherein the alkyd (II) comprises an unsaturated fatty acid.

5. The formulation of claim 1 further comprising water.

6. The formulation of claim 1 wherein said solvent is at least one of: a methyl acetate, methyl ethyl ketone, toluene, tetrahydrofuran, $C_2$-$C_6$ alkyl acetate, AROMATIC 100, or AROMATIC 150.

7. A one part, storage stable polymerizable formulation consisting essentially of:
a first polymerizable compound that has the formula:

$$Y-X-(CR_2-RC=CR)_n-R \qquad (1)$$

where R in each occurrence is independently H, $C_1$-$C_4$ alkyl, $C_1$-$C_4$ perfluoroalkyl, $C_6$ aryl, $C_6$ aryl having at least one substituent of $C_1$-$C_4$ alkyl; n is an integer of 1 to 50; X is oxygen or R; and Y is an alkyd;
a free radical polymerization initiator;
an anti-skinning agent;
one or more monomeric ethylenically unsaturated polymerizable compounds of methacrylate esters of polyethylene glycols, trimethylol propane trimethacrylate, or ethoxylated bisphenol A dimethacrylate;
an organic solvent in which said first polymerizable compound and said one or more monomeric ethylenically unsaturated polymerizable compounds are soluble, said solvent providing storage stability and upon evaporation of said solvent, a rate of polymerization of said formulation accelerates independent of addition of a second part; and
an optional additive of at least one of a water, transition metal cure accelerator, a filler, a plasticizer, a colorant, and a cure inhibitor;
wherein the formulation is at least 30 total weight percent solids.

8. The formulation of claim 7 wherein the alkyd comprises an unsaturated fatty acid.

9. The formulation of claim 7 wherein the transition metal cure accelerator is present.

10. The formulation of claim 7 wherein the water is present.

11. The formulation of claim 7 wherein said solvent is at least one of: a methyl acetate, methyl ethyl ketone, toluene, tetrahydrofuran, $C_2$-$C_6$ alkyl acetate, AROMATIC 100, or AROMATIC 150.

12. The formulation of claim 7 wherein the formulation is between 60 and 92 total weight percent solids.

13. A process of forming a polymerized coating on an article comprising:
applying a one part, storage stable polymerizable formulation to a substrate of the article, said one part, storage stable polymerizable formulation comprising:
a first polymerizable compound comprising allelic moieties;
a second polymerizable compound that has the formula:

$$Y-X-(CR_2-RC=CR)_n-R \qquad (1)$$

where R in each occurrence is independently H, $C_1$-$C_4$ alkyl, $C_1$-$C_4$ perfluoroalkyl, $C_6$ aryl, $C_6$ aryl having at least one substituent of $C_1$-$C_4$ alkyl; n is an integer of 1 to 50; X is oxygen or R; and Y is one of a nullity or a polymeric resin backbone of acrylic, oligomeric ester of up to 30 repeat units, polyester, epoxy, polyether, alkyd, or polyurethane;
an organic solvent in which said first polymerizable compound and said second polymerizable compound are soluble, said solvent providing storage stability and upon evaporation of said solvent, a rate of polymerization of said formulation accelerates independent of addition of a second part;
one or more monomeric ethylenically unsaturated polymerizable compounds of methacrylate esters of polyethylene glycols, trimethylol propane trimethacrylate, or ethoxylated bisphenol A dimethacrylate;
an anti-skinning agent; and
a transition metal salt cure accelerator; and
an optional additive of at least one of a free radical polymerization initiator, a filler, a plasticizer, a colorant, and a cure inhibitor;
wherein the formulation is 30 to 92 total weight percent solids; and
allowing sufficient time for said solvent to evaporate to accelerate a rate of cure of said polymerizable formulation to form a polymerized coating on the article.

14. The process of claim 13 wherein the formulation is applied by one of spray, brush or roll.

15. The process of claim 13 wherein the substrate is overlayered with a corrosion layer and the applying step occurs absent prior corrosion layer removal and the formulation penetrates beneath the corrosion layer before cure and at least partially embeds the corrosion layer in the polymerized coating.

16. The process of claim 13 wherein the polymerized coating forms a moisture and air barrier.

17. The process of claim 13 further comprising adding a dye or pigment to the formulation prior to the applying step.

18. The formulation of claim 7 further comprising a third polymerizable compound that has the formula:

$$Y-R-O(O)C-RC=CR_2 \qquad (2)$$

where R in each occurrence is independently H, $C_1$-$C_4$ alkyl, $C_1$-$C_4$ perfluoroalkyl, $C_6$ aryl, $C_6$ aryl having at least one substituent of $C_1$-$C_4$ alkyl and Y is an alkyd (II).

19. The formulation of claim 18 wherein the alkyd (II) comprises an unsaturated fatty acid.

20. The process of claim 13 wherein the formulation further comprises a third polymerizable compound that has the formula:

$$Y-R-O(O)C-RC=CR_2 \qquad (2)$$

where R in each occurrence is independently H, $C_1$-$C_4$ alkyl, $C_1$-$C_4$ perfluoroalkyl, $C_6$ aryl, $C_6$ aryl having at least one substituent of $C_1$-$C_4$ alkyl and Y is an alkyd (II).

21. The process of claim 20 wherein the alkyd (II) comprises an unsaturated fatty acid.

22. A one part, storage stable polymerizable formulation comprising:
a first polymerizable compound comprising allylic moieties;
a second polymerizable compound that has the formula:

$$Y-X-(CR_2-RC=CR)_n-R \qquad (1)$$

where R in each occurrence is independently H, $C_1$-$C_4$ alkyl, $C_1$-$C_4$ perfluoroalkyl, $C_6$ aryl, $C_6$ aryl having at least one substituent of $C_1$-$C_4$ alkyl; n is an integer of 1 to 50; X is oxygen or R; and Y is one of a nullity or a polymeric resin backbone of acrylic, oligomeric ester of up to 30 repeat units, polyester, epoxy, polyether, alkyd, or polyurethane;
a third polymerizable compound that has the formula:

$$Y-R-O(O)C-RC=CR_2 \qquad (2)$$

where R in each occurrence is independently H, $C_1$-$C_4$ alkyl, $C_1$-$C_4$ perfluoroalkyl, $C_6$ aryl, $C_6$ aryl having at least one substituent of $C_1$-$C_4$ alkyl and Y is an alkyd (II);

an organic solvent in which said first polymerizable compound, said second polymerizable compound and said third polymerizable compound are soluble, said solvent providing storage stability and upon evaporation of said solvent, a rate of polymerization of said formulation accelerates independent of addition of a second part;

an anti-skinning agent; and a transition metal salt cure accelerator; and an optional additive of at least one of a free radical polymerization initiator, a filler, a plasticizer, a colorant, and a cure inhibitor;

wherein the formulation is 30 to 92 total weight percent solids.

23. The formulation of claim 22 wherein the alkyd comprises an unsaturated fatty acid.

24. The formulation of claim 22 further comprising one or more monomeric ethylenically unsaturated polymerizable compounds of methacrylate esters of polyethylene glycols, trimethylol propane trimethacrylate, or ethoxylated bisphenol A dimethacrylate.

25. The formulation of claim 22 wherein the alkyd (II) comprises an unsaturated fatty acid.

26. The formulation of claim 22 further comprising water.

27. The formulation of claim 22 wherein said solvent is at least one of: a methyl acetate, methyl ethyl ketone, toluene, tetrahydrofuran, $C_2$-$C_6$ alkyl acetate, AROMATIC 100, or AROMATIC 150.

28. The formulation of claim 22 wherein the formulation is between 60 and 92 total weight percent solids.

* * * * *